United States Patent
Niemiec et al.

(10) Patent No.: US 11,086,310 B2
(45) Date of Patent: Aug. 10, 2021

(54) METHOD AND APPARATUS FOR REAL TIME MODEL PREDICTIVE CONTROL OPERATOR SUPPORT IN INDUSTRIAL PROCESS CONTROL AND AUTOMATION SYSTEMS

(71) Applicant: Honeywell International Inc., Morristown, NJ (US)

(72) Inventors: Michael Niemiec, Dexter, MI (US); Andrew Trenchard, Hampshire (GB); Christopher Webb, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 494 days.

(21) Appl. No.: 14/722,897

(22) Filed: May 27, 2015

(65) Prior Publication Data
US 2016/0349740 A1 Dec. 1, 2016

(51) Int. Cl.
*G05B 19/418* (2006.01)
*G05B 23/02* (2006.01)

(52) U.S. Cl.
CPC ..... *G05B 23/0286* (2013.01); *G05B 23/0291* (2013.01)

(58) Field of Classification Search
CPC ........................................... G05B 2219/31465
USPC ...................................................... 700/30, 54
See application file for complete search history.

(56) References Cited

U.S. PATENT DOCUMENTS

| | | | |
|---|---|---|---|
| 5,351,184 A | | 9/1994 | Lu et al. |
| 5,602,761 A | * | 2/1997 | Spoerre .................. G01H 1/003 702/179 |
| 2004/0123600 A1 | | 7/2004 | Brunell et al. |
| 2005/0171626 A1 | * | 8/2005 | Schwarm ........... G05B 23/0294 700/108 |
| 2007/0168057 A1 | * | 7/2007 | Blevins et al. ........ G05B 13/02 700/53 |
| 2007/0225835 A1 | | 9/2007 | Zhu |
| 2009/0319059 A1 | * | 12/2009 | Renfro ................... G05B 17/02 700/30 |
| 2010/0312452 A1 | * | 12/2010 | De Tricaud ........... F02D 31/004 701/102 |

(Continued)

FOREIGN PATENT DOCUMENTS

| EP | 1321840 B1 | 1/2004 |
|---|---|---|
| WO | 2013/087973 A1 | 6/2013 |

OTHER PUBLICATIONS

Shariff et al., "Real-time Artificial Intelligence Control and Optimization of a Full-scale WTP" IWA Publishing 2006, 161 Pgs (p. 5). (Year: 2006).*

(Continued)

*Primary Examiner* — Emilio J Saavedra
(74) *Attorney, Agent, or Firm* — Seager, Tufte & Wickhem, LLP (57) ABSTRACT

A method includes obtaining measurements associated with a plurality of controlled variables (CVs) and a plurality of manipulated variables (MVs). The method also includes detecting an irregular operating condition of a CV or an MV. The method also includes analyzing case specific operating conditions based on the irregular operating condition. The method further includes removing the irregular operating condition based on analyzing the case specific operating conditions.

20 Claims, 6 Drawing Sheets

(56) References Cited

U.S. PATENT DOCUMENTS

2011/0173496 A1 7/2011 Hosek et al.
2013/0317629 A1 11/2013 Shapiro et al.
2015/0134647 A1* 5/2015 Sayyarrodsari ... G06F 17/30958
  707/723
2016/0319198 A1* 11/2016 Quanci .................. C10B 15/02

OTHER PUBLICATIONS

O'connor, "A Process Control Primer" Honeywell, Jul. 2000, 144 pgs. (Year: 2000).*
Notification of Transmittal of the International Search Report and the Written Opinion of the International Searching Authority, or the Declaration dated Aug. 18, 2016 in connection with International Patent Application No. PCT/US2016/031595.

* cited by examiner

METHOD AND APPARATUS FOR REAL TIME MODEL PREDICTIVE CONTROL OPERATOR SUPPORT IN INDUSTRIAL PROCESS CONTROL AND AUTOMATION SYSTEMS

TECHNICAL FIELD

This disclosure relates generally to industrial process control and automation systems. More specifically, this disclosure relates to a method and apparatus for real time model predictive control operator support in industrial process control and automation systems.

BACKGROUND

Model predictive controllers (MPC) are remarkably useful and adaptable tools for implementing advanced control strategies. The adaptability of MPC requires in careful configuration for specific applications, requiring an in depth understanding of both the process and control technology. MPC applications often are configured as complex, black box technology that do not always react as might be expected in real life operating conditions, resulting in disabling or switching off different applications, especially during upset conditions, losing operator confidence in the MPC applications.

SUMMARY

This disclosure provides a method and apparatus for advanced control using function blocks in industrial process control and automation systems.

In a first embodiment, a method includes obtaining measurements associated with a plurality of controlled variables (CV) and a plurality of manipulated variables (MV) of a controller. The method also includes detecting an irregular operating condition of a CV or an MV. The method also includes analyzing case specific operating conditions based on the irregular operating condition. The method further includes removing the irregular operating condition based on analyzing the case specific operating conditions.

In a second embodiment, an apparatus includes at least one memory device having a shared memory. The apparatus also includes at least one processing device configured to obtain measurements associated with a plurality of controlled variables (CV) and a plurality of manipulated variables (MV) of a controller. The at least one processing device is also configured to detect an irregular operating condition of a CV or an MV. The at least one processing device is also configured to analyze case specific operating conditions based on the irregular operating condition. The at least one processing device is further configured to remove the irregular operating condition based on analyzing the case specific operating conditions.

In a third embodiment, a non-transitory computer readable medium embodies a computer program. The computer program includes computer readable program code for obtaining measurements associated with a plurality of controlled variables (CV) and a plurality of manipulated variables (MV) of a controller. The computer program also includes computer readable program code for detecting an irregular operating condition of a CV or an MV. The computer program also includes computer readable program code for analyzing case specific operating conditions based on the irregular operating condition. The computer program further includes computer readable program code for removing the irregular operating condition based on analyzing the case specific operating conditions.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
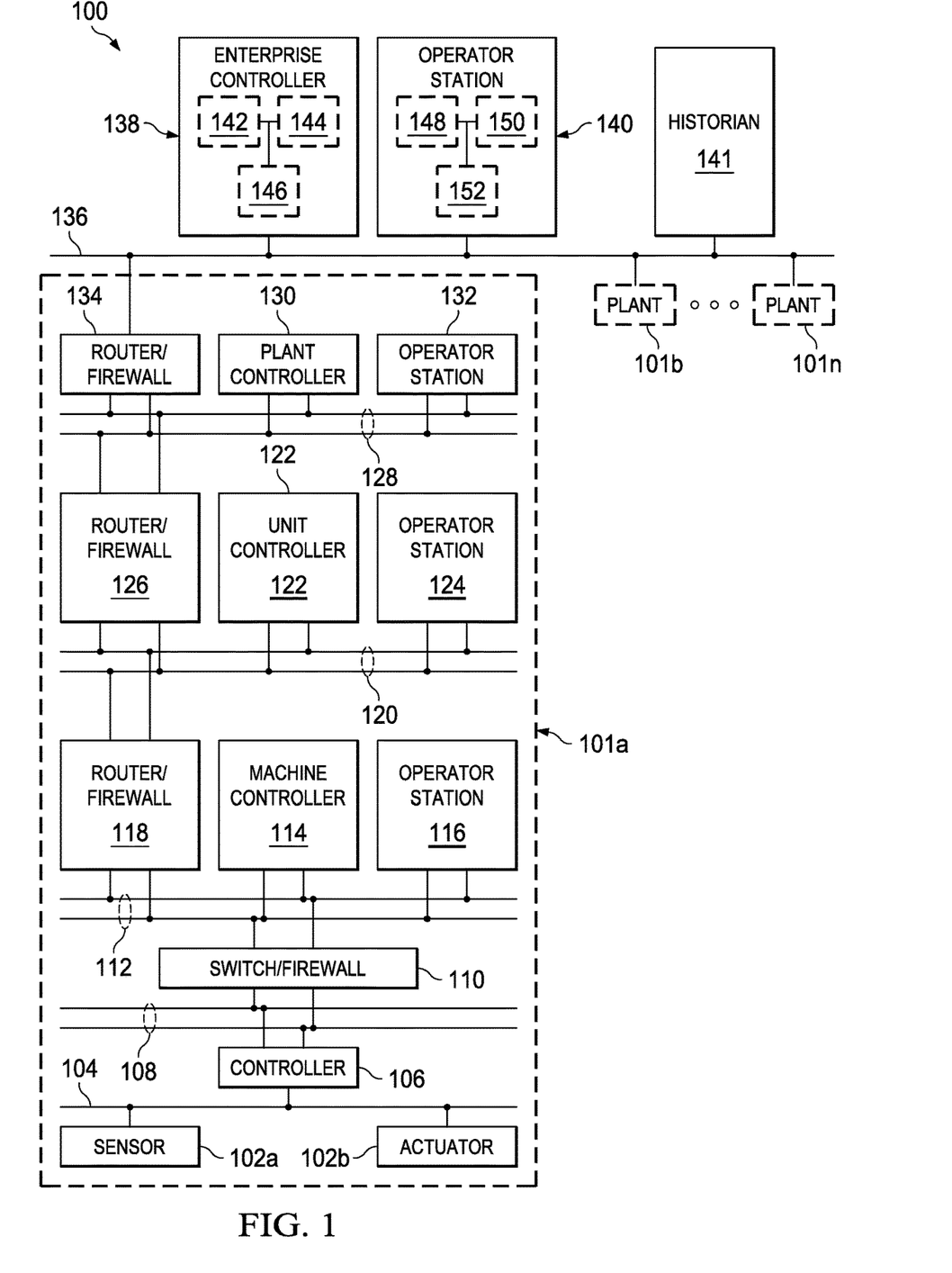
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Embodiments of this disclosure provide a support tool to help the operator understand the inner workings of the controller to more intelligently determine (1) whether to shut off the controller or leave it running; (2) how to correct common operating problems; and (3) whether current operation may lead to future problems. At every operating cycle, the support tool analyzes current controller operations. When operational problems, including current and potential future operating problems, are identified, they are flagged and reported to the operator. The support tool casts its recommendations in terms of actions that an operator can take and does not address configuration or tuning problems, normally addressed by an engineer.

The support tool intimately understands the operation of an MPC controller in order to identify both current and potential future operational problems and evaluates how the controller has and will address them. Irregular operating conditions are separated into a number of different groups depending on the type of problem and unique solutions are provided to the operator for each irregular operating condition.

The following types of process variables are also discussed below:
- CV—a Controlled Variable denoting a variable whose value is controlled to be at or near a setpoint or within a desired range;
- MV—a Manipulated Variable denoting a variable that is adjusted in order to alter the value of at least one CV, but which also has to be maintained within a safe operating range; and
- DV—a Disturbance Variable denoting a variable whose value has an effect on the process but is not controlled or adjusted.

As an example, a controlled variable may denote a flow rate of material, a manipulated variable may denote a position of a valve that alters the flow rate, and a disturbance variable may denote ambient temperature that affects the flow rate but that cannot be altered or controlled.

The disclosed embodiments provide an operator heuristics approach to address the irregular operating conditions. Example of irregular operating conditions include a steady state value of a CV violating a hard limit, a current value of a CV violating a hard limit, the steady state value of a CV oscillating, the current value of a CV moving excessively, a current value of a MV not moving enough, and a current value of a MV moving excessively.

The current value of a CV is the current value read by a respective sensor. For example, the current value of temperature is the current temperature read by a thermocouple. The future value is a calculated predicted value for the variable after a specified period of time. For example, the temperature can increase or decrease a certain number of degrees in a respective amount of time. The steady state value is a future value of the CV once the system stabilizes. For example, the temperature can increase to a certain amount, but no further. Multiple future values can occur between the current value and the steady state value.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which MPC or other advanced control functionality can be implemented using function blocks, this functionality can be used in any other suitable device or system.

Figure 2:
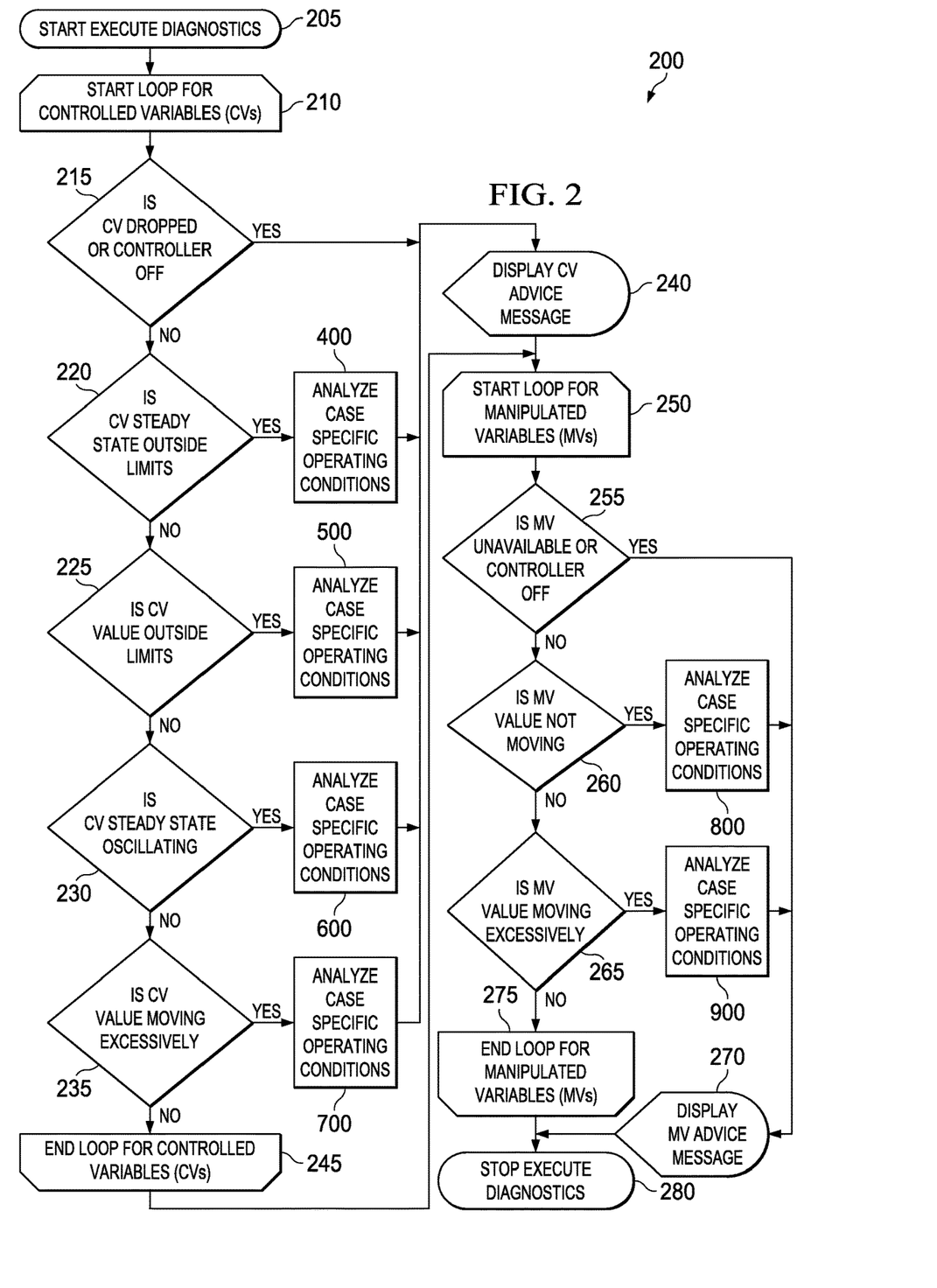
FIG. 2 illustrates a process for real time model predictive control operator support in industrial process control and automation systems according to this disclosure.

FIG. 2 illustrates a process 200 for real time model predictive control operator support in industrial process control and automation systems according to this disclosure. For ease of explanation, the process 200 is described using the analyses of FIGS. 4 through 9. However, the process 200 could involve the use of any analysis. Also, the process 200 is described as being performed by the controller 106, although any other suitable device could be used.

As shown in FIG. 2, the controller 106 starts executing diagnostics on one or more variables of a process at step 205 and starts a loop for one or more CVs at step 210. The controller 106 determines whether each CV is dropped or is turned off at step 215. When a CV is active, the controller 106 detects whether the steady state value of the CV is outside the limits at step 220, whether the current value of the CV is outside the limits at step 225, whether the steady state value of the CV is oscillating at step 230, and whether the current value of the CV is moving excessively at step 235. When it is detected that the steady state value of the CV is outside the limits at step 220, the controller 106 performs an analysis 400 on the steady state value of the CV violating the limits. When it is detected that the current value of the CV is outside the limits at step 225, the controller 106 performs an analysis 500 on the current value of the CV violating the limits. When it is detected that the steady state value of the CV is oscillating at step 230, the controller 106 performs an analysis 600 on the oscillating steady state value. When it is detected that the current value of the CV is moving excessively at step 235, the controller 106 performs an analysis 700 on the current value of the CV moving excessively. The controller 106 displays a CV advice message at step 240, when an irregular operating condition is detected, and ends the loop for the CVs at step 245 when the controller does not detect an irregular operating condition of a CV. The analyses of the case specific operating conditions for irregular operating conditions of a CV are described in more detail with respect to FIGS. 3 through 7.

Once the CV advice is displayed, the controller 106 starts a loop for MVs at step 250. The controller 106 determines whether each MV is either unavailable or is turned off at step 255. When an MV is active, the controller 106 detects whether the current value of the MV is not moving at step 260 or whether the current value of the MV is moving excessively at step 265. When it is detected that the current value of the MV is not moving at step 260, the controller 106 performs an analysis 800 on the current value of the MV not moving enough. When it is detected that the current value of the MV is moving excessively at step 265, the controller 106 performs an analysis 900 on the current value of the CV moving excessively. The controller 106 displays an MV advice message at step 270 when an irregular operating condition is detected, and ends the loop for the CVs at step 275 when the controller 106 does not detect an irregular operating condition of a CV. The case specific operating conditions for irregular operating conditions of a CV are described in more detail with respect to FIGS. 8 and 9. Once both loops are completed, the controller 106 stops execution of the diagnostics at step 280.

Although FIG. 2 illustrates one example of a process 200 for real time model predictive control operator support in industrial process control and automation systems, various changes may be made to FIG. 2. For example, various steps shown in FIG. 2 could overlap, occur in parallel, occur in a different order, or occur any number of times. As a particular example, the loop for CVs may or may not occur before the loop for MVs, so the controller 106 could execute the loop for MVs one or multiple times before the execution of the loop for CVs completes.

Figure 3:
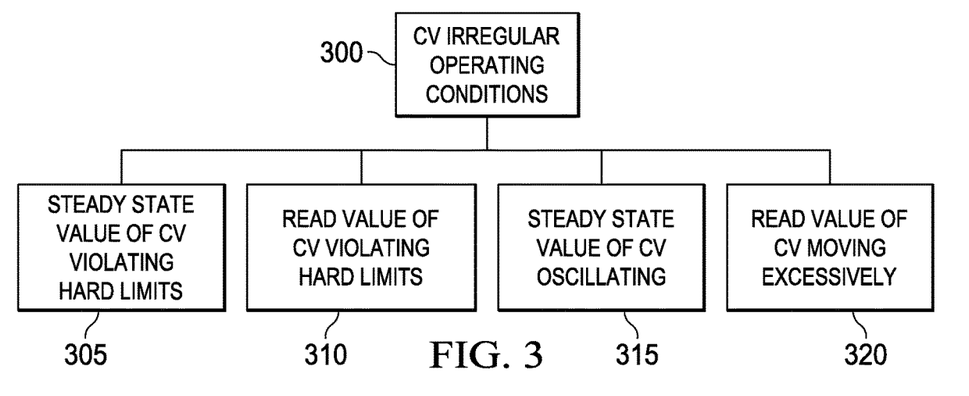
FIG. 3 illustrates irregular operating conditions associated with a controlled variable of a controller according to this disclosure.

FIG. 3 illustrates irregular operating conditions 300 associated with a controlled variable of a controller 106 according to this disclosure. The irregular operating conditions 300 are described as occurring on the sensors 102a of the controller 106, although the irregular operating conditions could be associated with any other suitable device.

As shown in FIG. 3, the CV can be irregular due to multiple irregular operation conditions 300. For example, the steady state value of the CV can violate one or more hard limits 305, the current value of the CV can violate one or more hard limits 310, the steady state value of the CV can oscillate 315, and the current value of the CV can move excessively 320. When one of the irregular operating conditions 300 is detected, the controller 106 analyzes the case specific operating condition.

Although FIG. 3 illustrates various examples of irregular operating conditions 300 for a controlled variable of a controller 106, various changes may be made to FIG. 3. For example, multiple operating conditions 300 shown in FIG. 3 could occur simultaneously or occur for multiple controlled variables. As a particular example, the operating conditions can include the steady state value for the CV violating a hard limit and the current value for the CV violating a hard limit.

Figure 4:
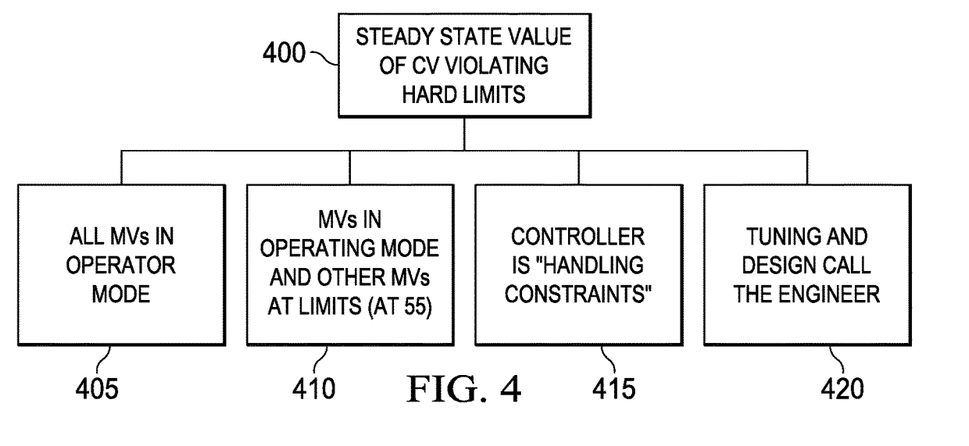
FIG. 4 illustrates an analysis for a steady state value of a controlled variable violating a hard limit according to this disclosure.

FIG. 4 illustrates an analysis 400 for a steady state value of a CV violating a hard limit according to this disclosure. For ease of explanation, the analysis 400 is described in connection with process 200 of FIG. 2. However, the analysis 400 could involve the use of any process. Also, the analysis 400 is described as being performed by the controller 106, although any other suitable device could be used.

The analysis 400 for a steady state value of a CV violating a hard limit occurs when the controller 106 predicts a specific CV to violate a high or low limit at the end of the control horizon, at steady state, but the current value of the CV is within the hard limits. The logic is initially limited to stable CVs since any infeasibility is due to the availability of MV degrees of freedom and constraining limit bounds. The controller 106 checks that the logic works when the limits are ramping and for transformed CVs. Transformed CVs are values where the measurements passes through a reversible nonlinear function (e.g. log(x) or neural network) and MPC controller acts upon this nonlinear value not the original measurement. The controller 106 analyzes for this irregular operating condition as soon as a CV steady state value is infeasible or after a number of successive intervals.

In logic step 405, the controller 106 checks whether all the MVs related to the selected CV are in operator mode i.e. not adjustable by the robust model predictive controller (RMPC). A variable in operator mode is monitored by the system, but adjusted manually by the operator. The controller 106 predicts that the selected CV cannot be stabilized within the high and low limits because the outputs (MVs) cannot be moved or controlled, due to the fact that MVs are all in an operator access mode. The controller 106 instructs the operator to consider switching one or more MVs to a controller mode, such as an RMPC mode. The controller mode allows the controller 106 to manipulate the MVs.

In logic step 410, the controller 106 checks whether all the MVs related to the selected CV are either in an operator mode, at a hard bound, or wound up, i.e., none can be moved in a direction to reduce the selected CV error. A hard bound is a set value that limits the operational range for the MV. The hard bound can be determined by a manufacturer or by an operator. A MV that is wound up means that, while the MV is not at the hard bound limit, the MV cannot move any further due to physical constraints of the actuating system.

The controller 106 loops through the MVs related to the CV to identify the MVs in operator mode, identify the MVs operating at hard bounds, and identify MVs that are wound up. These conditions create situations in which the controller 106 cannot reduce the steady state error.

The controller 106 predicts that the selected CV cannot stabilize within the high and low limits because the outputs cannot move sufficiently to control the selected CV. The controller 106 instructs the operator to consider relaxing the MV limits or switching additional MVs into RMPC mode. In RMPC mode, the values are controlled by the MPC application and not directly by the operator.

In logic step 415, the controller 106 checks whether the CV is in error trade-off with one or more other CVs. When it is infeasible to meet the high or low specification for a CV, the error of the entire system is minimized. This minimization allows another CV to go out of bounds in attempt to get the first CV closer to its respective bounds. The controller 106 loops through all the CVs to determine if two or more have steady state violations. The controller 106 uses a list of active constraints from a solution of an economic problem, which is setup by the controller to maximize an objective function (maximize revenue, minimize costs, etc), to determine whether the selected CV is in steady state error trade-off with another CV, requiring the active constraint set to be exposed to the data pool. The controller 106 loops through the MVs related to the CV to identify the MVs in an operator mode, identify the MVs operating at hard bounds, and identify MVs that are wound up.

The controller 106 predicts that the selected CV cannot stabilize within the high and low limits because reducing the steady state error in the selected CV would increase the steady state error in another CV. The controller 106 instructs the operator to either relax the limits on the other CV, explore reducing the steady state error in the CV of interest or increasing or reducing the related MV limits or switching an MV into RMPC mode to reduce the steady state error in the other CV.

In logic step 420, the controller 106 instructs the operator that there is not a clear reason why the steady state value is violating the limit. The controller 106 predicts that the selected CV cannot be controlled within the high and low limits because of the way it is designed or tuned and that an engineer or other help support should be contacted to troubleshoot the application or assembly. The controller 106 provides additional information for the engineer, such as when the solution is thresholding or when there is a solver return error code.

Although FIG. 4 illustrates one example of an analysis 400 for a steady state value of a CV violating a hard limit, various changes may be made to FIG. 4. For example, various steps shown in FIG. 4 could overlap, occur in parallel, occur in a different order, or occur any number of times.

Figure 5:
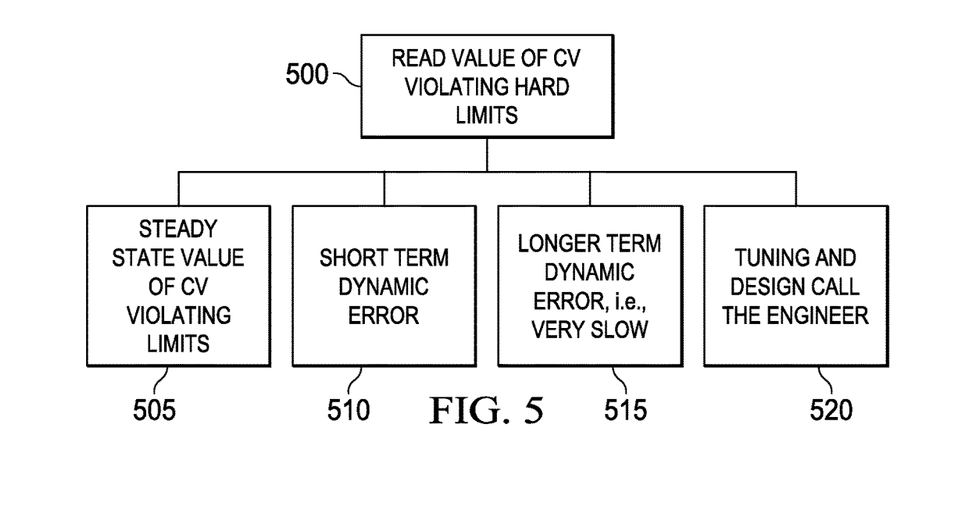
FIG. 5 illustrates an analysis for a current value of a controlled variable violating a hard limit according to this disclosure.

FIG. 5 illustrates an analysis 500 for a current value of a CV violating a hard limit according to this disclosure. For ease of explanation, the analysis 500 is described in connection with process 200 of FIG. 2. However, the analysis 500 could involve the use of any process. Also, the analysis 500 is described as being performed by the controller 106, although any other suitable device could be used.

The analysis 500 for a current value of a CV violating a hard limit occurs when a specific current value for a selected CV is currently outside a high or low limit. The logic steps are initially limited to stable CVs since any infeasibility is due to the availability of MV degrees of freedom and constraining limit bounds. The controller 106 checks whether the logic works when limits are ramping and for transformed CVs. The controller 106 also considers whether any explanation is available to the operator as soon as a CV current value is infeasible or after a number of successive intervals.

In logic step 505, the controller 106 determines the current value, the future value, and the steady state values of the CV are outside of the same limit. The controller 106 first stabilizes the steady state value of the CV within the range by performing the logic steps 405 through 420, as necessary. The controller 106 instructs the operator that the CV cannot stabilize within the operation range due to the limited range of the outputs (MVs) and instructs operator in the same manner as logic steps 405 through 420, as necessary.

In logic step 510, the controller 106 checks that the steady state value and the future value of the CV are feasible. Steady state implies the process with controller has fully stabilized and reaches stasis. The future value is a point in the future at which the controller has made a major impact on process. For example, the future value is when 90-95% of any errors predicted to be resolved. The controller 106 verifies that the CV forced trajectory looks reasonable from the current point of violation to back within the limits. The forced trajectory is the excepted response of the plant to the set of moves planned by the controller. The controller 106 allows the CV to have an inverse or overshoot response that causes a short-term larger deviation, but reduces the overall amount of time to stabilize within the limits. The CV stabilizes smoothly with the future value prediction blocking points.

The controller 106 calculates the time required to bring a CV within the limit using the forced trajectory. The controller 106 relies on move cause logic in determining an explanation for the deviation. The controller 106 determines whether a response will decrease the amount of time for stabilization of the CV. For example, determining whether any MVs, related to the selected CV, are in an operator mode, whether any MVs are clamped at a limit, and whether any MVs are related to other CVs that are limiting the MV. The move cause information might include information for determining whether an MV is making decoupling moves and making a connection between dynamically competing CVs. Logic step 510 is useful for a number of explanations and could be evaluated once and used multiple times to determine whether anything can assist the controller 106 to dynamically improve the performance of the CV.

The controller 106 instructs the operator that, while the controller 106 cannot currently operate the CV within the limits, the CV is predicted to stabilize within the limits in a specified amount of time. The controller 106 also instructs the operator that relaxing specified MV limits or switching specified MVs to RMPC mode could decrease the amount of time required for the CV to stabilize within the limits.

In logic step 515, the controller 106 determines that the steady state value of the CV stabilizing within the limits is feasible and the future value of the CV stabilizing within the limits is not feasible. When the future value of CV stabilizing within the limits is not feasible, the controller 106 determines the stabilization process is slow and will take a longer amount of time. The controller 106 performs steps similar to logic step 510, but indicates to the operator that the stabilization occurs for a time duration longer than the first future value.

In logic step 520, the controller 106 instructs the operator that there is not a clear reason why the current value is violating the limit. The controller 106 predicts the selected CV cannot stabilize within the high and low limits because of the way it is designed or tuned and that an engineer or other help support should be contacted to troubleshoot the application or assembly. The controller 106 provides additional information for the engineer, such as when the solution is thresholding or when there is a solver return error code.

Although FIG. 5 illustrates one example of an analysis 500 for a current value of a CV violating a hard limit, various changes may be made to FIG. 5. For example, various steps shown in FIG. 5 could overlap, occur in parallel, occur in a different order, or occur any number of times.

Figure 6:
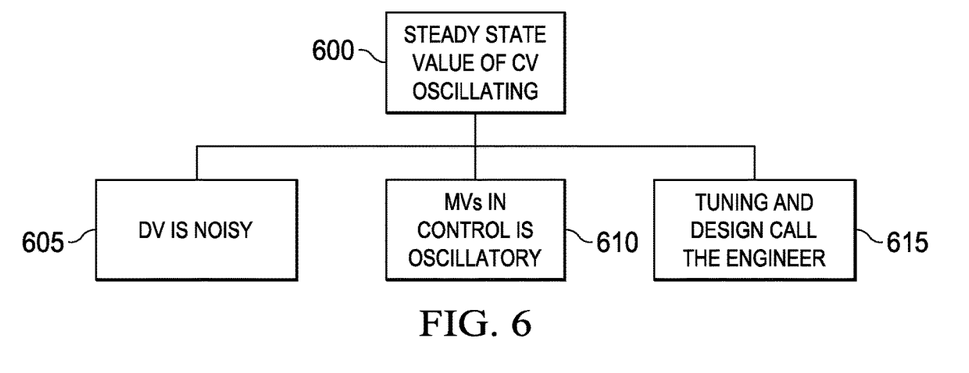
FIG. 6 illustrates an analysis for a steady state value of a controlled variable oscillating according to this disclosure.

FIG. 6 illustrates an analysis 600 for a steady state value of a CV oscillating according to this disclosure. For ease of explanation, the analysis 600 is described in connection with process 200 of FIG. 2. However, the analysis 600 could involve the use of any process. Also, the analysis 600 is described as being performed by the controller 106, although any other suitable device could be used.

The analysis 600 for a steady state value of a CV oscillating occurs when the steady state value oscillates, sometimes randomly, around a mean operating value. Different reasons for oscillation include, for example, faulty sensors, process equipment, or environmental factors. The detection of an oscillating steady state value is subjective to the variable itself, the hard limits, the process itself, as well as other factors. In certain embodiments, a steady state value oscillating is detected when the steady state value violates alternating soft limits a specific amount of times, such as twice, within a certain amount of readings, such as ten. In other embodiments, the steady state values increase and decrease over a threshold amount, such as a percentage or ratio of the range within the limits, in the certain amount of time.

In certain embodiments, the steady state value oscillating is determined based on the standard deviation of a rolling time window. The controller 106 calculates the standard deviation of the steady state values for each of the CVs, the steady state value for each of the MVs, and the steady state values of the DVs over a rolling time window, such as the ten most recent current values. In certain embodiments, software is used to determine the standard deviations. The steady state prediction Y is calculated using equation (1):

$$Y = aU_1 + bU_2 + cU_3 + \text{Bias} \tag{eq.1}$$

where a, b, c are constants in the equation, Y is the steady state prediction for the CV, and $U_1$, $U_2$, and $U_3$ are different current values for the MVs or DVs.

Using the coefficients in equation (1), a standard deviation of the CV steady state is calculated using equation (2) based on the standard deviations of the MV and DV steady state values:

$$\sigma_y = \sqrt{a^2 \sigma_{U1}^2 + b^2 \sigma_{U2}^2 + c^2 \sigma_{U3}^2} \tag{eq.2}$$

where $\sigma_y$ is the standard deviation for the CV steady state value. If the estimate of $\sigma_y$ from equation 2 is comparable with the value directly calculated from the variation in the steady state value of the CV, determined by the controller, then equation 2 is used to attribute the source of the variation in the CV to one or more MVs or DVs based on a greater than normal standard deviation.

In logic step 605, the controller 106 determines that the steady state value oscillating is traceable to one or more DVs. The controller 106 determines that removing the one or more DVs will stabilize the steady state value of the CV. The controller 106 instructs the operator that the steady state value of the CV is oscillating due to one or more noisy DVs and dropping the noisy DV(s) will stabilize the CV, but maintenance is required to stabilize the DV(s) or faulty DV sensor(s).

In logic step 610, the controller 106 traces the steady state CV value oscillating to one or more of the MVs in RMPC mode. The controller 106 determines the reason why the traced MVs are causing the oscillating steady state value. The controller 106 instructs the operator that the steady state value of the CV is oscillating due to one or more MVs and switching the MV to an operator access mode will stabilize the CV steady state value, but reasons for the MV steady state changing should be further investigated by a plant engineer.

In logic step 615, the controller 106 instructs the operator that there is not a clear reason why the steady state value is oscillating. The controller 106 predicts the selected CV cannot stabilize within the high and low limits because of the way it is designed or tuned and that an engineer or other help support should be contacted to troubleshoot the application or assembly. The controller 106 provides additional information for the engineer, such as possible causes including an MV in feed-forward mode (FFWD) with a noisy current value, which is similar to a DV with a noisy current value or a gross model gain error.

Although FIG. 6 illustrates one example of an analysis 600 for a steady state value of a CV oscillating, various changes may be made to FIG. 6. For example, various steps shown in FIG. 6 could overlap, occur in parallel, occur in a different order, or occur any number of times.

Figure 7:
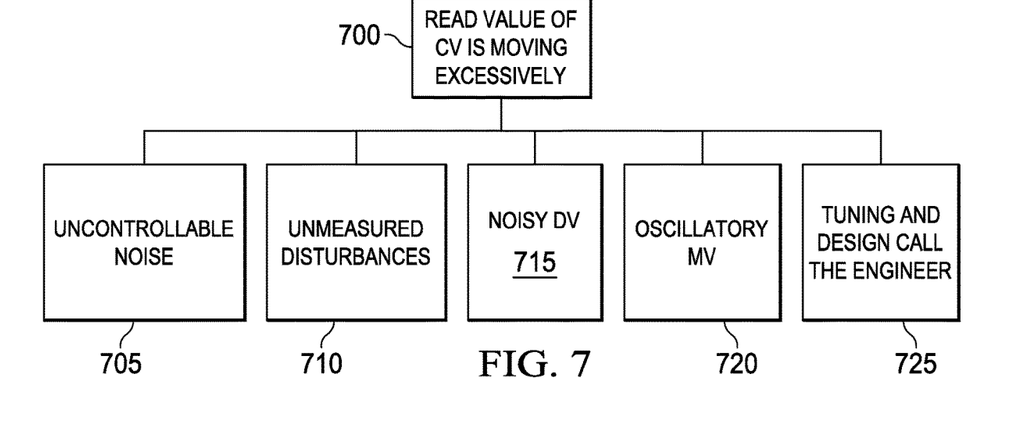
FIG. 7 illustrates an analysis for a current value of a controlled variable moving excessively according to this disclosure.

FIG. 7 illustrates an analysis 700 for a current value of a CV moving excessively according to this disclosure. For ease of explanation, the analysis 700 is described in connection with process 200 of FIG. 2. However, the analysis 700 could involve the use of any process. Also, the analysis 700 is described as being performed by the controller 106, although any other suitable device could be used.

The case specific analysis 700 for a current value of a CV moving excessively occurs when the current value is moving excessively or is noisy. Different reasons for oscillation include, for example, faulty sensors, process equipment, or environmental factors. The detection of a current value moving excessively is subjective to the variable itself, the hard limits, the process itself, as well as other factors. In certain embodiments, a current value moving excessively is detected by comparing the standard deviation of the CV current value compared to a fixed value, such as the CV error weight divided by two.

In logic step 705, the controller 106 calculates the standard deviation of the CV current value and the CV predicted value over a certain time period, such as one or two CV closed loop response intervals. The controller 106 calculates the current values from a rolling window of data values or PHD data. Under-sampling the interval-to-interval data on slow CVs increases the computational efficiency. When the standard deviation of the CV current value is greater than the standard deviation of the CV predicted value, this indicates the noise is not predictable and not controllable by the application, since the noise is faster than the bias update time constant. The controller 106 instructs the operator the CV is noisy because of uncontrollable noise and the variation is external to the controller 106 and too fast for a response.

In logic step 710, the controller 106 calculates and compares the standard deviation of the CV current value and the unbiased model predicted value, i.e., to determine the relative noise power in the prediction against the model bias. When the noise is largely unpredicted, then the controller 106 evaluates whether any one of the following would improve the dynamic control: switching related MVs from operator mode to RMPC mode, relaxing limits on clamp related MVs, and relaxing limits on other CVs related to the related MVs. This logic is used to improve the dynamic performance of the CV and, even when only evaluated once, can be used multiple times.

The controller 106 instructs the operator that the CV current value is moving excessively due to unmeasured disturbances. To increase the dynamic stability of the CV current value, the limits on related MVs need to be relaxed or switched from operator mode to RMPC mode.

When the dominant cause of the CV variability is predictable, it is possible to distinguish between a controller 106 induced noise and an MV or subsequent related CVs noise. The controller 106 calculates the standard deviation in the dynamic sub model contributions to the unbiased model predicted value. Equations 1 and 2 apply to dynamic predictions in the same manner as the steady state prediction.

In logic step 715, the controller 106 traces the CV current value noise to one or more DVs. Unlike when a noisy DV is traced to the steady state value oscillating, dropping a DV could negatively impact the CV current value and also the overall performance of the process. The controller 106 evaluates the CV for any possible dynamic control improvements. The controller 106 instructs the operator that measured disturbance DVs are creating the noise in the CV and which operator mode DVs to investigate to reduce the noise and increase the stability of the CV.

In logic step 720, the controller 106 traces the current value of the CV moving excessively to MVs in RMPC mode. The controller 106 instructs the operator that the steady state value of the CV is oscillating due to one or more MVs, which are in turn caused by one or more noisy DVs. Dropping the noisy DV will stabilize the MV and CV, but maintenance is required to stabilize the DV or faulty DV sensor. When the MV is noisy because of the limits of another shared CV, the controller 106 determines whether the limits on the other CV can be relaxed in order to reduce the noisy MV. The controller 106 instructs the operator that the steady state value of the CV is oscillating due to a noisy one or more MVs, which are in turn caused by other related CVs and relaxing the limits on the other CVs will reduce the noisy MVs and CV.

In logic step 725, the controller 106 instructs the operator that the reason is not clear why the current value of the CV is moving excessively. The controller 106 predicts that the selected CV is moving excessively because of the way it is designed or tuned and that an engineer or other help support should be contacted to troubleshoot the application or assembly. The controller 106 provides additional information for the engineer, such as possible causes including an MV in FFWD with a noisy current value, which is similar to a DV in with a noisy current value, model gain updates from Profit Bridge (a HONEYWELL application for adjusting model gains), or a gross model gain error.

Although FIG. 7 illustrates one example of an analysis 700 for a current value of a CV violating a hard limit, various changes may be made to FIG. 7. For example, various steps shown in FIG. 7 could overlap, occur in parallel, occur in a different order, or occur any number of times.

Figure 8:
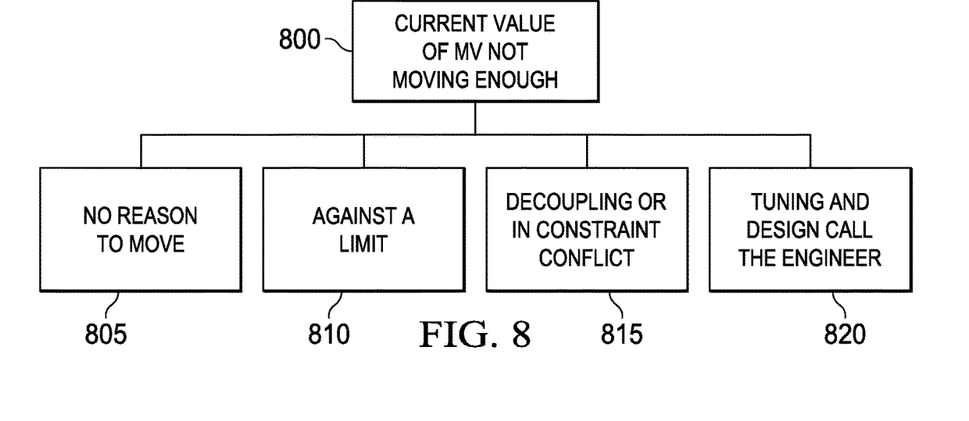
FIG. 8 illustrates an analysis for a current value of a manipulated variable not moving enough according to this disclosure.

FIG. 8 illustrates an analysis 800 for a current value of a manipulated variable not moving enough according to this disclosure. For ease of explanation, the analysis 800 is described in connection with process 200 of FIG. 2. However, the analysis 800 could involve the use of any process. Also, the analysis 800 is described as being performed by the controller 106, although any other suitable device could be used.

The case specific analysis 800 for an MV not moving enough occurs when an MV value is not moving significantly. The controller 106 detects this irregular operating condition by comparing the standard deviation of the MV current value against a fixed value. Ideally the fixed value should be adjustable with a reasonable default value, such as ten percent of the average MV maximum move up or move down parameter.

In logic step 805, the controller 106 leverages the MV move cause logic to determine whether the MV is required to move significantly, such as when the move cause logic is "not determined." For example, when there is not significant CV error to resolve and the MV optimization speed is slow, the MV is not required to move quickly. The controller 106 instructs the operator that the MV is not moving significantly because all the variables are stabilized or operating within the parameters or limits.

In logic step 810, the controller 106 determines the MV cannot move because the output is pushed up by the optimizer against a limit. The controller 106 instructs the operator that the optimizer has determined that the best operating point for the MV is against its limit and to relax the MV limit when more MV movement is required.

In logic step 815, the controller 106 uses the MV move cause logic or active set information from the solver to determine whether the MV is making decoupling moves to resolve dynamic control error in two or more competing CVs. The MV move cause should be "Interaction-control." The move cause logic provides details on the dominant CV impacted by the MV. In certain embodiments, the move cause logic provides details to further CVs or all CVs impacted by the MV. The controller 106 instructs the operator that the output MV is making small or no moves. Increasing the MV output would cause a CV to deviate from the CV's limit over the CV's future path, and decreasing the MV output would cause another CV to deviate more from the other CV's limit over the over CV's future path. Relaxing other related MVs to the CV or the other CV could reduce the limit error.

In logic step 820, the controller 106 instructs the operator that the reason is not clear why the current value of the MV is not moving enough. The controller 106 predicts that the selected MV is not moving enough because of the way it is designed or tuned and that an engineer or other help support should be contacted to troubleshoot the application or assembly.

Although FIG. 8 illustrates one example of an analysis 800 for a current value of a MV not moving enough, various changes may be made to FIG. 8. For example, various steps shown in FIG. 8 could overlap, occur in parallel, occur in a different order, or occur any number of times.

Figure 9:
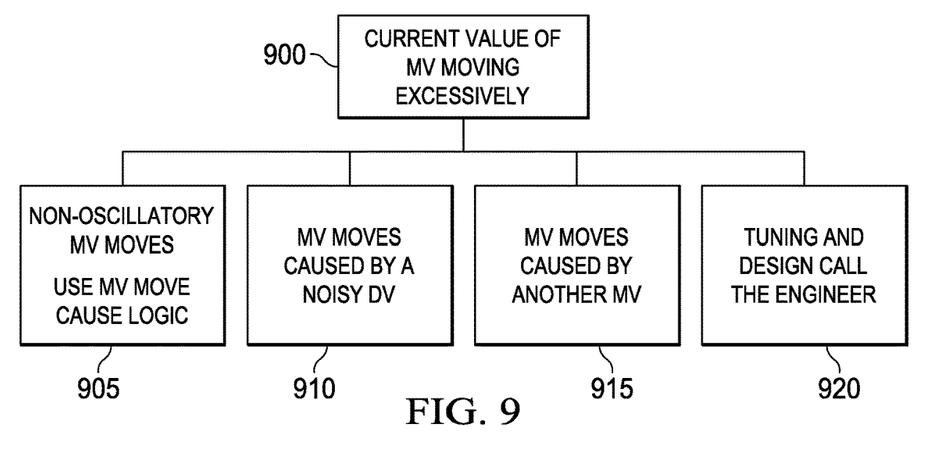
FIG. 9 illustrates an analysis for a current value of a manipulated variable moving excessively according to this disclosure.

FIG. 9 illustrates an analysis 900 for a current value of a manipulated variable moving excessively according to this disclosure. For ease of explanation, the analysis 900 is described in connection with process 200 of FIG. 2. However, the analysis 900 could involve the use of any process. Also, the analysis 900 is described as being performed by the controller 106, although any other suitable device could be used.

The case specific analysis 900 for the current value of the MV moving excessively occurs when a current value of an MV is moving greater than normal or expected. The controller 106 detects this irregular operating condition by comparing the standard deviation for the MV current value against a fixed value. The fixed value ideally is adjustable with a default value, such as forty percent of the average MV maximum move up or move down tuning parameter. In certain embodiments, the controller 106 leverages the MV move cause logic, which provides the explanation for any move cause except "not determined."

In logic step 905, the controller 106 determines whether the MV is oscillatory or has made a significant singular move before restabilizing. The controller 106 monitors the changes in variables and determines the moves are oscillatory using power spectral density (PSD) analysis. When the changes are not oscillatory, the controller 106 uses the move cause logic to determine the reason for the MV moving. When the move cause is "Control," the controller 106 moves the MV to control a CV. When the move cause is "Interaction-Control," the controller 106 moves the MV in order to enable another MV to control the CV. When the move cause logic is "Optimization" or "Interaction-Opt," the controller 106 moves the MV for optimization of the process.

In logic step 910, when the MV is oscillatory, the controller 106 traces the movement of the MV to the oscillations of a DV and the MV is attempting to perform feedforward compensation. The controller 106 instructs the operator that the output MV is moving in attempt to compensate for a noisy DV, to relax the limits on related CVs and to reduce the noise of the DV.

In logic step 915, when the MV is oscillatory, the controller 106 traces the movement of the MV to another MV or CV oscillating. The controller 106 detects this irregular operating condition using an oscillation algorithm, such as power spectral density analysis. The controller 106 instructs the operator that the MV is oscillating due to another MV or CV oscillating and relaxing the limits on the other MV or CV could reduce the movement.

In logic step 920, the controller 106 instructs the operator that the reason is not clear why the MV current value is moving excessively. The controller 106 predicts that the selected MV current value is moving excessively because of the way it is designed or tuned and that an engineer or other help support should be contacted to troubleshoot the application or assembly.

Although FIG. 9 illustrates one example of an analysis 900 for a current value of an MV moving excessively, various changes may be made to FIG. 9. For example, various steps shown in FIG. 9 could overlap, occur in parallel, occur in a different order, or occur any number of times.

Figure 10:
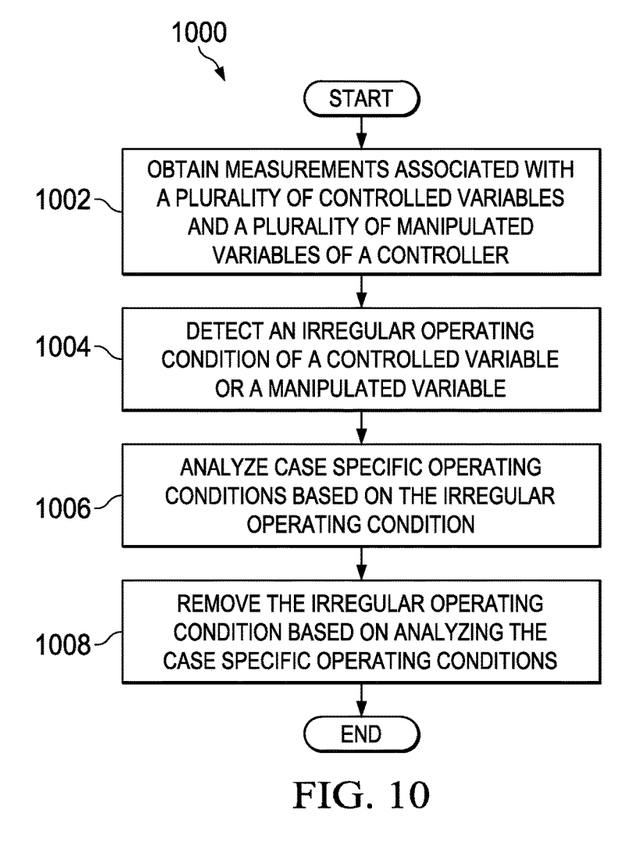
FIG. 10 illustrates an example method for real time model predictive control operator support in industrial process control and automation systems according to this disclosure.

FIG. 10 illustrates an example method 1000 for real time model predictive control operator support in industrial process control and automation systems according to the disclosure. For ease of explanation, the method 1000 is described in connection with process 200 of FIG. 2, and the analyses from FIGS. 4 through 9. However, the method 1000 could involve the use of any process or analysis. Also, the method 1000 is described as being performed by the controller 106, although any other suitable device could be used.

In step 1002, the controller 106 obtains measurements associated with a plurality of controlled variables and a plurality of manipulated variables of a controller 106. In step 1004, the controller 106 detects an irregular operating condition of a CV or an MV. In step 1006, the controller 106 analyzes the case specific operating conditions based on the irregular operating condition. In step 1008, the controller 106 removes the irregular operating condition based on analyzing the case specific operating conditions.

Although FIG. 10 illustrates one example of a method 1000 for advanced control in an industrial process control and automation system, various changes may be made to FIG. 10. For example, various steps shown in FIG. 10 could overlap, occur in parallel, occur in a different order, or occur any number of times. As a particular example, analyzing the case specific operating conditions may or may not occur during detecting an irregular operating condition depending on various factors, so some case specific operating conditions are analyzed before the detection of irregular operating conditions completes.

Figure 11:
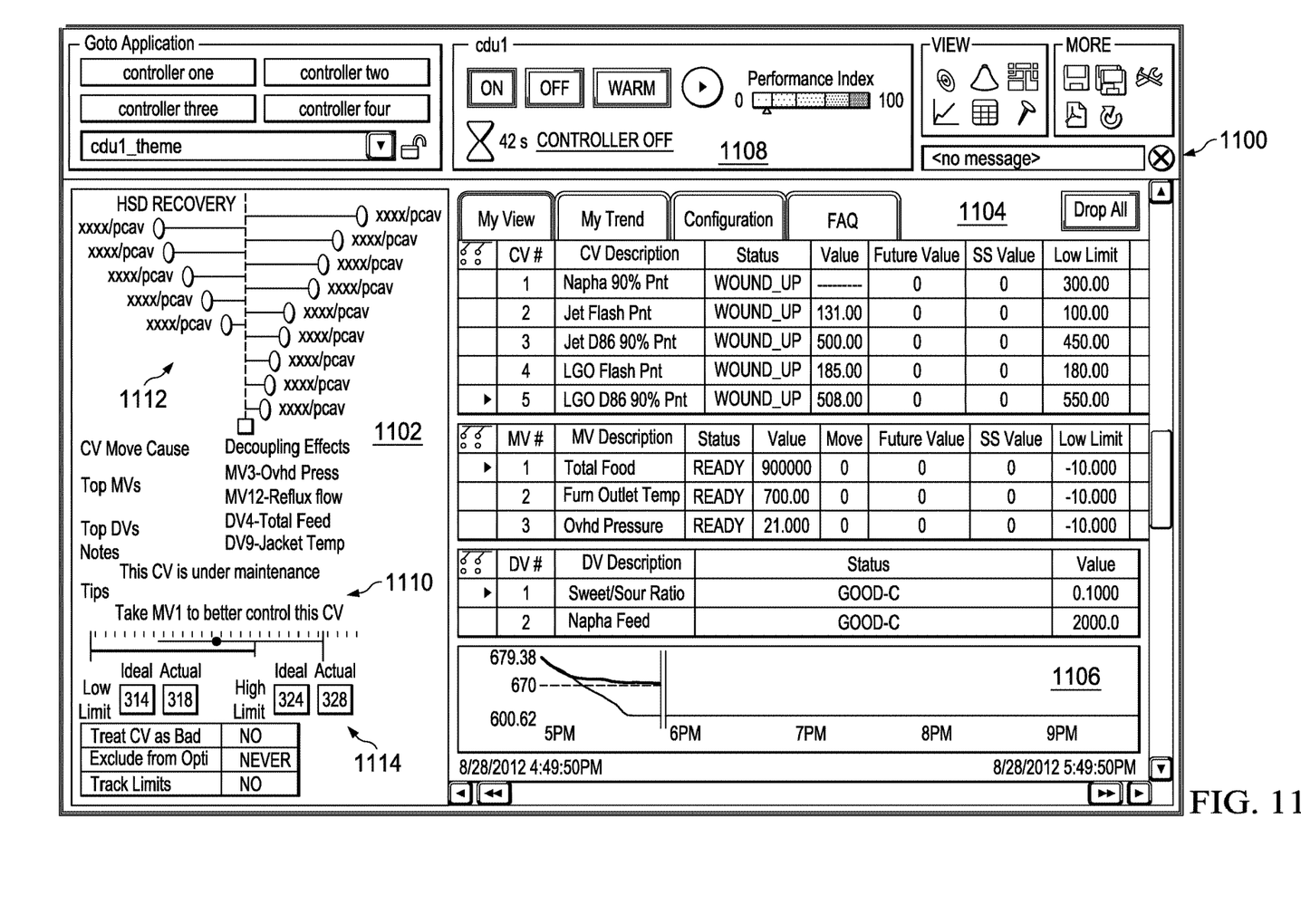
FIG. 11 illustrates an interface for real time model predictive control operator support in industrial process control and automation systems according to this disclosure.

FIG. 11 illustrates an interface 1100 for real time model predictive control operator support in industrial process control and automation systems according to this disclosure. The interface 1100 could, for example, be used to adjust variables monitored by a process controller 106. However, any other suitable interface could be used to adjust variables monitored by a process controller 106, and the interface 1100 could be used in any other suitable device or system.

The interface 1100 provides the operator feedback and improvements on the performance of the controller 106. The interface 1100 allows the operator to control, for example, the limits of the variables, switching the control mode of the variable, or dropping variables. The interface 1100 includes an operator guidance window 1102 (OGW), a detailed view 1104 of the variables, a graphical view 1106 of selected variables, and a performance index 1108.

The OGW 1102 includes instructions 1110, a gain tree 1112, and an ideal limit range 1114. The instructions 1110 include the notification and advice from the controller 106 about the operation of a selected variable, including the case specific analysis for irregular operating conditions. The gain tree 1112 illustrates the gain impact of the MVs and DVs related to the select CV. The lengths of the branches are proportional to the impact of the variable. The gain impact of each variable is determined by equation 3.

$$\text{Gain Impact} = EU\ \text{Gain} * \frac{\textit{TypicalMoveSize}(\text{of the } MV)}{(\textit{HighEUGiveUp} + \textit{LowEUGiveUp})/2} \quad \text{(eq. 3)}$$

where the EU stands for the engineering unit, such as the real world units on a variable. In other embodiments, the CV equal concern weights or other CV error tradeoff tuning parameters are alternatives to the high and low EU give up tuning parameters. The ideal limit range 1114 includes a bar for advisory operating conditions and a bar for the current value and limits.

The detailed view 1104 of the variables provides a full list of all the CVs, MVs, and DVs along with their respective statuses and values. The variables in the detailed view 1104 can be individually selected for viewing in the OGW 1102 or one or more can be selected for viewing in the graphical view 1106. The graphical view 1106 displays the selected variable(s) in a graph. The value of the variable(s), such as the steady state value, can be selected individually or combined into a single graph. The range of the graph can also be adjusted accordingly.

The performance index 1108 is a visualization of the MPC controller performance and is displayed at the top of the interface as a slider bar, where the color changes from good to bad. The performance index 1108 incorporates the maneuverability, the usefulness, the reliability, the criticality, the value, the acceptance, and the lost opportunity of the process. The maneuverability measures the degrees of freedom available for controlling different variables and how many variables are bound up, which is defined as the percentage of available MV over the total MV. The usefulness measures the values of the CVs compare to the optimization limits, which are computed by the number of CVs within a tolerance of the optimization limits over the number of available MVs. The CVs with quadratic factors or with tier pricing are automatically promoted to be within the tolerance limit. The reliability measures the amount of CVs exceeding their hard limits, which is computed as the weighted error outside of the limits over the number of available MVs. The criticality is a measure of the MVs involved with optimization, which is determined based on the optimization factors to identify degrees of freedom not involved with the optimization where a value lower than 100% indicates a problem with the objective function step. The value measures the overall operation to optimal conditions, which is calculated as the difference between a steady state objective function value and a current objective function value normalized by a range. The value variable indicates whether the current operation is within a tolerance of steady state optimal operation. The acceptance measures how aggressively the MVs are changing, which is computed as a weighted sum of the ratio MV movement over the MV rate of change limit. The weighted sum is divided by the number of available MVs. The lost opportunity measures the change in objective value if variables were at ideal limits, which is computed as the sum of all ideal limits minus current limits multiplied by the shadow price. The sum is divided by the controller objective value.

The index weights can be set to lessen, remove, or accentuate the contribution of the individual metrics in the performance index 1108. The index weights are set from a number representing no contribution, such as zero, to a number representing full contribution, such as one.

Although FIG. 11 illustrates one example of an interface 1100 used for real time model predictive control operator support in industrial process control and automation systems, various changes may be made to FIG. 11.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising: obtaining measurements associated with a plurality of controlled variables (CVs) and a plurality of manipulated variables (MVs) of a controller;
    detecting an irregular operating condition of a CV or an MV, wherein detecting the irregular operating condition comprises one or more of:
    monitoring for a steady state value of the CV violating a hard limit,
    monitoring for a current value of the CV violating a hard limit,
    monitoring for the steady state value of the CV oscillating,
    monitoring for the current value of the CV moving excessively,
    monitoring for a current value of the MV not moving enough, and monitoring for the current value of the MV moving excessively, wherein the current value of the CV or the MV is determined to be moving excessively based on a standard deviation of the current value of the CV or the MV compared to a corresponding fixed value;
    analyzing case specific operating conditions based on the irregular operating condition, wherein for at least one irregular operation condition the analyzing case specific conditions produces an indication to switch one or more MVs from an operator controlled mode to a controller controlled mode;
    in response to the indication from analyzing case specific operating conditions based on the irregular operating condition, switching one or more MVs from the operator controlled mode in which the one or more MVs are controlled by an operator to the controller controlled mode in which the one or more MVs are controlled by the controller;
    and
    operating at least one physical component in an industrial process control and automation system using the controller with the one or more MVs in the controller controlled mode.

2. The method of claim 1, wherein when the steady state value of the CV violating the hard limit is determined for the irregular operating condition, the method further comprises one or more of: relaxing limits of one of more of the MVs when the current value of an MV is at a hard or soft bound; switching one or more additional MVs from an operator mode to a controller mode when the one or more MVs are wound up; reducing error in a steady state value of another CV violating a hard limit that is limiting the MV from moving; relaxing the hard limit on the other CV; and/or providing operating information to a display when the controller cannot resolve the irregular operating condition.

3. The method of claim 1, wherein when the current value of the CV violating the hard limit is determined for the irregular operating condition, the method further comprises one or more of: allowing a short term dynamic error for the CV when a steady state value of the CV and a future value of the CV are both feasible; allowing a long term dynamic error for the CV when the steady state value of the CV is feasible and the future value of the CV is not feasible; and/or providing operating information to a display when the controller cannot resolve the irregular operating condition.

4. The method of claim 1, wherein when the steady state value of the CV oscillating is determined for the irregular operating condition, the method further comprises one or more of: dropping a disturbance variable (DV) when the steady state value of the CV is caused by high variation of the DV; expanding limits of another CV, controlled by a noisy MV also controlling the CV, that is oscillating when the noisy MV is moving in response to the other CV; and/or providing operating information to a display when the controller cannot resolve the irregular operating condition.

5. The method of claim 1, wherein when the current value of the CV moving excessively is determined for the irregular operating condition, the method further comprises one or more of: determining uncontrollable noise external to the controller when the standard deviation of the current value of the CV is greater than a standard deviation of a predictive value (PV) of the CV; improving dynamic control of the CV when the standard deviation of the current value of the CV is greater than a standard deviation of an unbiased model PV; dropping a DV when a steady state value of the CV is caused by high variation of the DV; switching a noisy MV from the controller mode to the operator mode; and/or providing operating information to a display when the controller cannot resolve the irregular operating condition.

6. The method of claim 1, wherein when the current value of the MV not moving enough is determined for the irregular operating condition, the method further comprises one or more of: determining whether the current value of the CV affected by the MV are within limits of the CV; relaxing the MV when the current value is at a limit of the MV; relaxing other MVs related to the CV when moving the MV would cause a future value of the CV to deviate past one of the of the CV; and/or providing operating information to a display when the controller cannot resolve the irregular operating condition.

7. The method of claim 1, wherein when the current value of the MV moving excessively is determined for the irregular operating condition, the method further comprises one or more of: using an MV move cause logic to determine a reason for the current value of the MV moving excessively; expanding limits of another CV when the MV moving excessively is caused by a noisy DV; using a common oscillation algorithm when the MV moving excessively is caused by another MV or the other CV moving excessively; and/or providing operating information to a display when the controller cannot resolve the irregular operating condition.

8. The method of claim 1, wherein the detecting an irregular operating condition of a CV or an MV further comprises one or more of:
    conducting a CV loop to identify an irregular condition related to the CV; and
    conducting a MV loop to identify an irregular condition of the MV after the CV loop has ended.

9. An apparatus comprising:
at least one memory device comprising a shared memory; and
at least one processing device configured to:
obtain measurements associated with a plurality of controlled variables (CVs) and a plurality of manipulated variables (MVs) of a controller;
detect an irregular operating condition of a CV or an MV, wherein detecting the irregular operating condition comprises one or more of:
monitoring for a steady state value of the CV violating a hard limit,
monitoring for a current value of the CV violating a hard limit,
monitoring for the steady state value of the CV oscillating,
monitoring for the current value of the CV moving excessively,
monitoring for a current value of the MV not moving enough, and
monitoring for the current value of the MV moving excessively, wherein the value of the CV or the MV is determined to be moving excessively based on a standard deviation of the current value of the CV or the MV compared to a corresponding fixed value;
analyze case specific operating conditions based on the irregular operating condition, wherein for at least one irregular operation condition the analyzing case specific conditions produces an indication to switch one or more MVs from an operator controlled mode to a controller controlled mode;
in response to the indication from analyzing case specific operating conditions based on the irregular operating condition, switching one or more MVs from the operator controlled mode in which the one or more MVs are controlled by an operator to the controller controlled mode in which the one or more MVs are controlled by the controller; and
operate at least one physical component in an industrial process control and automation system using the controller with the one or more MVs in the controller controlled mode.

10. The apparatus of claim 9, wherein when the steady state value of the CV violating the hard limit is determined for the irregular operating condition, the at least one processing device is configured to:
relax limits of one of more of the MVs when the current value of an MV is at a hard bound;
switch one or more additional MVs from the operator controlled mode to the controller controlled mode when the one or more MVs are wound up;
reduce error in a steady state value of another CV violating a hard limit that is limiting the MV from moving;
relax the hard limit on the other CV; and/or
provide operating information to a display when the controller cannot resolve the irregular operating condition.

11. The apparatus of claim 10, wherein when the current value of the CV violating the hard limit is determined for the irregular operating condition, the at least one processing device is configured to:
allow a short term dynamic error for the CV when a steady state value of the CV and a future value of the CV are both feasible;
allow a long term dynamic error for the CV when the steady state value of the CV is feasible and the future value of the CV is not feasible; and/or
provide operating information to a display when the controller cannot resolve the irregular operating condition.

12. The apparatus of claim 9, wherein when the steady state value of the CV oscillating is determined for the irregular operating condition, the at least one processing device is configured to:
drop a disturbance variable (DV) when the steady state value of the CV is caused by high variation of the DV;
expand limits of another CV, controlled by a noisy MV also controlling the CV, that is oscillating when the noisy MV is moving in response to the other CV; and/or
provide operating information to a display when the controller cannot resolve the irregular operating condition.

13. The apparatus of claim 9, wherein when the current value of the CV moving excessively is determined for the irregular operating condition, the at least one processing device is configured to:
determine uncontrollable noise external to controller when the standard deviation of the current value of the CV is greater than a standard deviation of a predictive value (PV) of the CV;
improve dynamic control of the CV when the standard deviation of the current value of the CV is greater than a standard deviation of an unbiased model PV;
drop a DV when a steady state value of the CV is caused by high variation of the DV;
switch a noisy MV from the controller controlled mode to the operator controlled mode;
and/or
provide operating information to a display when the controller cannot resolve the irregular operating condition.

14. The apparatus of claim 9, wherein when the current value of the MV not moving enough is determined for the irregular operating condition, the at least one processing device is configured to:
determine whether the current value of the CV affected by the MV are within limits of the CV;
relax the MV when the current value is at a limit of the MV;
relax other MV related to the CV when moving the MV would cause a future value of the CV to deviate past one of the limits of the CV; and/or
provide operating information to a display when the controller cannot resolve the irregular operating condition.

15. The apparatus of claim 9, wherein when the current value of the MV moving excessively is determined for the irregular operating condition, the at least one processing device is configured to:
use an MV move cause logic to determine reason for the current value of the MV moving excessively;
expand limits of another CV when the MV moving excessively is caused by a noisy DV;
use a common oscillation algorithm when the MV moving excessively is cause by another MV or the other CV moving excessively; and/or
provide operating information to a display when the controller cannot resolve the irregular operating condition.

16. The apparatus of claim 9, wherein the detecting an irregular operating condition of a CV or an MV further comprises one or more of:
    conduct a CV loop to identify an irregular condition related to the CV; and
    conduct a MV loop to identify an irregular condition of the MV after the CV loop has ended.

17. A non-transitory computer readable medium embodying a computer program, the computer program comprising model predictive control computer readable program code for:
    obtaining measurements associated with a plurality of controlled variables (CVs) and a plurality of manipulated variables (MVs) of a controller;
    detecting an irregular operating condition of a CV or an MV, wherein detecting the irregular operating condition comprises one or more of:
        monitoring for a steady state value of the CV violating a hard limit,
        monitoring for a current value of the CV violating a hard limit,
        monitoring for the steady state value of the CV oscillating,
        monitoring for the current value of the CV moving excessively,
        monitoring for a current value of the MV not moving enough, and
        monitoring for the current value of the MV moving excessively, wherein the current value of the CV or the MV is determined to be moving excessively based on a standard deviation of the current value of the CV or the MV compared to a corresponding fixed value;
    analyzing case specific operating conditions based on the irregular operating condition, wherein for at least one irregular operation condition the analyzing case specific conditions produces an indication to switch one or more MVs from an operator controlled mode to a controller controlled mode;
    in response to the indication from analyzing case specific operating conditions based on the irregular operating condition, switching one or more MVs from the operator controlled mode in which the one or more MVs are controlled by an operator to the controller controlled mode in which the one or more MVs are controlled by the controller; and
    operating at least one physical component in an industrial process control and automation system using the controller with the irregular operating condition removed.

18. The non-transitory computer readable medium of claim 17, wherein when the steady state value of the CV violating the hard limit is determined for the irregular operating condition, the computer program further comprises model predictive control computer readable program code for:
    relaxing limits of one of more of the MVs when the current value of an MV is at a hard bound;
    switching one or more additional MVs from the operator controlled mode to the controller controlled mode when the one or more MVs are wound up;
    reducing error in a steady state value of another CV violating a hard limit that is limiting the MV from moving;
    relaxing the hard limit on the other CV; and/or
    providing operating information to a display when the controller cannot resolve the irregular operating condition.

19. The non-transitory computer readable medium of claim 18, wherein when the current value of the CV violating the hard limit is determined for the irregular operating condition, the computer program further comprises model predictive control computer readable program code for:
    allowing a short term dynamic error for the CV when a steady state value of the CV and a future value of the CV are both feasible;
    allowing a long term dynamic error for the CV when the steady state value of the CV is feasible and the future value of the CV is not feasible; and/or
    providing operating information to a display when the controller cannot resolve the irregular operating condition.

20. The non-transitory computer readable medium of claim 17, wherein the detecting an irregular operating condition of a CV or an MV further comprises one or more of:
    conducting a CV loop to identify an irregular condition related to the CV; and
    conducting a MV loop to identify an irregular condition of the MV after the CV loop has ended.

* * * * *